US012564919B2

(12) United States Patent
Brain

(10) Patent No.: US 12,564,919 B2
(45) Date of Patent: Mar. 3, 2026

(54) MANUAL IMPACT DRIVER

(71) Applicant: DYNOMEC LTD, Castleford (GB)

(72) Inventor: David Brain, Castleford (GB)

(73) Assignee: DYNOMEC LTD, Yorkshire (GB)

( * ) Notice: Subject to any disclaimer, the term of this patent is extended or adjusted under 35 U.S.C. 154(b) by 382 days.

(21) Appl. No.: 18/255,788

(22) PCT Filed: Dec. 2, 2021

(86) PCT No.: PCT/GB2021/053150
§ 371 (c)(1),
(2) Date: Jun. 2, 2023

(87) PCT Pub. No.: WO2022/118025
PCT Pub. Date: Jun. 9, 2022

(65) Prior Publication Data

US 2024/0009812 A1 Jan. 11, 2024

(30) Foreign Application Priority Data

Dec. 4, 2020 (GB) .................................... 2019176

(51) Int. Cl.
*B25B 19/00* (2006.01)
*B25B 23/00* (2006.01)
*B25D 1/16* (2006.01)

(52) U.S. Cl.
CPC .......... *B25B 19/00* (2013.01); *B25B 23/0007* (2013.01); *B25D 1/16* (2013.01)

(58) Field of Classification Search
CPC ..... B25B 19/00; B25B 27/18; B25B 23/0007; B25B 21/00; B25B 21/002; B25D 1/16
See application file for complete search history.

(56) References Cited

U.S. PATENT DOCUMENTS 1,743,505 A 1/1930 Turgeon
2,484,765 A 10/1949 Turgeon
(Continued)

FOREIGN PATENT DOCUMENTS

CN 2170187 Y 6/1994
DE 810739 C 8/1951
(Continued)

OTHER PUBLICATIONS

International Search Report for PCT/GB2021/053150, mailed Mar. 9, 2022, 4 pages.

(Continued)

*Primary Examiner* — David B. Thomas
(74) *Attorney, Agent, or Firm* — Nixon & Vanderhye, PC

(57) ABSTRACT

A manual impact driver for aiding the removal of a threaded fastening member from a structure, is disclosed having a longitudinal axis (L), the manual impact driver including a body having a first end and a second end and a sliding member configured to be coupled to the body at the second end. The impact driver is movable between a first configuration, upon impact at the first end of the body, a linear impact force is translated along the longitudinal axis (L) from the first end of the body to the sliding member and a second configuration, upon impact at the first end, the linear impact force produces a torque, about the longitudinal axis (L), at the sliding member. The impact driver is operable to switch between the configurations upon rotation, by a user, of the body with respect to the sliding member.

14 Claims, 7 Drawing Sheets

(56) References Cited

U.S. PATENT DOCUMENTS

| | | | | |
|---|---|---|---|---|
| 2,638,806 | A | 5/1953 | Spielman | |
| 3,366,187 | A * | 1/1968 | Von Tersch | B25B 19/00 81/463 |
| 4,561,507 | A * | 12/1985 | Liou | B25B 15/06 173/93 |
| 4,919,216 | A * | 4/1990 | Ikegami | B25B 15/06 173/124 |
| 5,012,709 | A * | 5/1991 | Su | B25B 19/00 81/463 |
| 6,370,993 | B1 * | 4/2002 | Pitstick | B25B 19/00 81/463 |
| 6,814,159 | B1 * | 11/2004 | Huang | B25B 19/00 81/463 |
| 7,051,628 | B2 * | 5/2006 | Wilson | B25B 19/00 81/463 |
| 8,650,988 | B2 * | 2/2014 | Yen | B25F 1/02 81/9.41 |
| 9,073,182 | B2 * | 7/2015 | Liou | B25D 16/006 |
| 10,286,528 | B2 * | 5/2019 | Hsieh | B25B 15/02 |
| 11,806,251 | B2 * | 11/2023 | Müller | A61F 2/46 |
| 2003/0110909 | A1 | 6/2003 | Liou | |
| 2014/0116204 | A1 | 5/2014 | Liou | |

FOREIGN PATENT DOCUMENTS

| | | | |
|---|---|---|---|
| DE | 102010037372 | A1 | 3/2012 |
| GB | 682567 | A | 11/1952 |
| GB | 686683 | A | 1/1953 |
| RU | 2065353 | C1 | 8/1996 |

OTHER PUBLICATIONS

Written Opinion of the ISA for PCT/GB2021/053150, mailed Mar. 9, 2022, 10 pages.

Combined Search and Examination Report for GB2019176.3, dated May 24, 2021, 8 pages.

* cited by examiner

MANUAL IMPACT DRIVER

CROSS REFERENCE TO RELATED APPLICATION

The present application is a National Phase of International Application Number PCT/GB2021/053150 filed Dec. 2, 2021, which designated the U.S. and claims priority benefits from Great Britain Application Number GB 2019176.3, filed Dec. 4, 2020, the entire contents of each of which are hereby incorporated by reference.

FIELD

The present invention is related to an apparatus, method and system of using an impact driver.

BACKGROUND

It is commonplace for fixings to be overtightened, meaning users struggle to remove them. The rotational force provided by a user turning a screwdriver is often insufficient to loosen the fixing.

Further, some threaded fastening members, such as wheel lock nuts, typically require specialist tools for removal. If these specialist tools are not available and a user needs to remove the threaded fastening members, then other solutions may be required.

Traditional impact drivers are used to loosen fixings which have become stuck, and which cannot be loosened by tools such as screwdrivers. These impact drivers are designed to convert at least part of a linear force to a rotational force. In other words, when the impact drivers are struck at one end, a rotational force will be produced at the other end. This feature is effected by a spring, which causes the driver to be biased towards the 'ready to be struck' configuration.

As traditional impact drivers are always configured to provide a rotational force, a two-stage process is required for many uses. For example, in a situation where a key is used to first cut into the fixture, prior to rotation, the user would need to use a first tool to apply the linear force to the key before using the impact driver to rotate the key.

Users of the traditional impact drivers often struggle with their use. Users will frequently mis-align the impact driver or simply not feel confident enough to generate enough force for the impact driver to be effective.

The aim of the disclosure outlined in this patent specification is to overcome at least some of the above-mentioned problems.

SUMMARY

According to the present invention there is provided an apparatus, method and system as set forth in the appended claims. Other features will be apparent from the dependent claims, and the description which follows.

According to a first example, there is provided a manual impact driver for aiding the removal of a threaded fastening member from a structure, the manual impact driver defining a longitudinal axis, the manual impact driver comprising a body comprising a first end and a second end and a sliding member configured to be coupled to the body at the second end, wherein the impact driver is movable between a first configuration wherein, upon impact at the first end of the body, a linear impact force is translated along the longitudinal axis from the first end of the body to the sliding member and a second configuration wherein, upon impact at the first end, the linear impact force produces a torque, about the longitudinal axis, at the sliding member; and wherein the impact driver is operable to switch between the configurations upon rotation, by a user, of the body with respect to the sliding member. This manual impact driver advantageously allows for both a linear force and a torque to be produced by the same device. The manual impact driver also advantageously allows a user to switch between different configurations. The manual impact driver is advantageously a single unit, with minimal joints and connections; therefore, the impact driver is more likely to be steady before impact from the linear force.

In one example, after impact in the second configuration, the impact driver may be configured to return to the first configuration. This advantageously defaults the impact driver to a first configuration, allowing the driver to be reused, without the need for resetting, by a user.

In one example, the body may comprise a through-hole extending from the first end to the second end of the body.

In one example, the sliding member may be situated inside the through-hole at the second end of the body. The sliding member may define a helical cavity and the axis of the helical cavity may be parallel to the longitudinal axis of the impact driver.

In one example, the body may comprise a pin extending across the through-hole of the body, perpendicular to the longitudinal axis of the manual impact driver. The pin may extend through the helical cavity of the sliding member and the pin is fixed relative to the body.

In one example, the body may further comprise a spring-loaded connector, attached to the through-hole of the body, and a central column, connected to the spring-loaded connector, towards the first end of the body. This advantageously allows for various accessories to be attached.

In one example, the through-hole may be shaped to define an internal shoulder located substantially towards the second end.

In one example, when the manual impact driver is in the first configuration, the sliding member may be abutted against the internal shoulder, and the pin of the body may be located substantially at a first end of the helical cavity, such that upon impact at the first end, the body and the sliding member move together along the longitudinal axis of the manual impact driver.

In one example, when the impact driver is in the second configuration, the sliding member may be spaced from the internal shoulder, and the pin of the body may be located substantially at a second end of the helical cavity. The abuttal of the sliding member against the internal shoulder in the first configuration advantageously ensures that the linear force generated at the first end of the body is transferred to the sliding member at the interface between the sliding member and the internal shoulder. This reduced the pressure on the pin, and therefore the pin is less likely to be damaged.

In one example, when the impact driver is in the second configuration, upon impact at the first end, the sliding member may be configured to move relative to the body, along the longitudinal axis of the manual impact driver, such that the sliding member rotates relative to the body as the helical cavity moves relative to the pin. The pin and the helical cavity may advantageously interact to convert a linear force into a rotational force.

In one example, the manual impact driver may further comprise a visual indicator configured to be hidden when the impact driver is in the first configuration and viewable when the impact driver is in the second configuration. The visual indicator advantageously allows a user to determine which configuration the impact driver is in, and therefore whether or not to strike the impact driver.

In one example, the manual impact driver may further comprise a replaceable anvil at the first end of the body, wherein, in use the anvil is configured to be struck, to produce the linear impact force. This advantageously allows for replacement of a part that is most likely to be damaged, without the need for replacing the entire impact driver.

In one example, the replaceable anvil may further comprise a spigot configured to be received in a locator hole of the body.

In one example, the replaceable anvil may be connected to the central column of the body, to allow the replaceable anvil to be retracted from the body, and rotated, to mis-align the spigot from the locator hole, such that the replaceable anvil can be held in a retracted position.

In one example, the manual impact driver may further comprise a protection plate located between a part of the removable anvil and the body. The protection plate advantageously protects the user's hand from mis-strikes. The protection plate also provides the user with additional confidence, such that they can strike the impact driver with sufficient force. Therefore, users are less likely to misreport a faulty impact driver.

In one example, the protection plate may be configured to rotate freely, with respect to the body.

This advantageously reduces the risk of a kickback from the impact driver, that may occur due to the inertia, if the protection plate were rigidly secured.

In one example, the protection plate may be substantially flat, circular plate and comprises a cut-out section to allow for the attachment and removal from the manual impact driver.

In one example, the sliding member may further comprise an attachment portion suitable for allowing the attachment of a tool.

In one example, there is provided a method of removal of a threaded fastening member comprising the steps of: aligning a manual impact driver with the threaded fastening member for removal; when the manual impact driver is in a first configuration, applying a linear impact force to a first end, wherein the linear impact force is translated along a longitudinal axis of the manual impact driver to a sliding member of the manual impact driver, switching, by a user, from the first configuration to a second configuration, by rotating a body of the manual impact driver with respect to the sliding member; and applying a linear impact force to the first end, wherein upon impact, the linear impact force produces a torque, about the longitudinal axis, at the sliding member.

In one example, there is provided a system of removing a threaded fastening member, comprising a manual impact driver as described above, and a tool.

All of the features contained herein may be combined with any of the above aspects, in any combination.

Although a few preferred embodiments of the present invention have been shown and described, it will be appreciated by those skilled in the art that various changes and modifications might be made without departing from the scope of the invention, as defined in the appended claims.

BRIEF DESCRIPTION OF DRAWINGS

For a better understanding of the invention, and to show how embodiments of the same may be carried into effect, reference will now be made, by way of example only, to the accompanying diagrammatic drawings in which.

SPECIFIC DESCRIPTION OF EMBODIMENTS

An apparatus, method and system of the present disclosure is described below.

In particular, the present disclosure is concerned with a manual impact driver, and method and system thereof.

Figure 1:
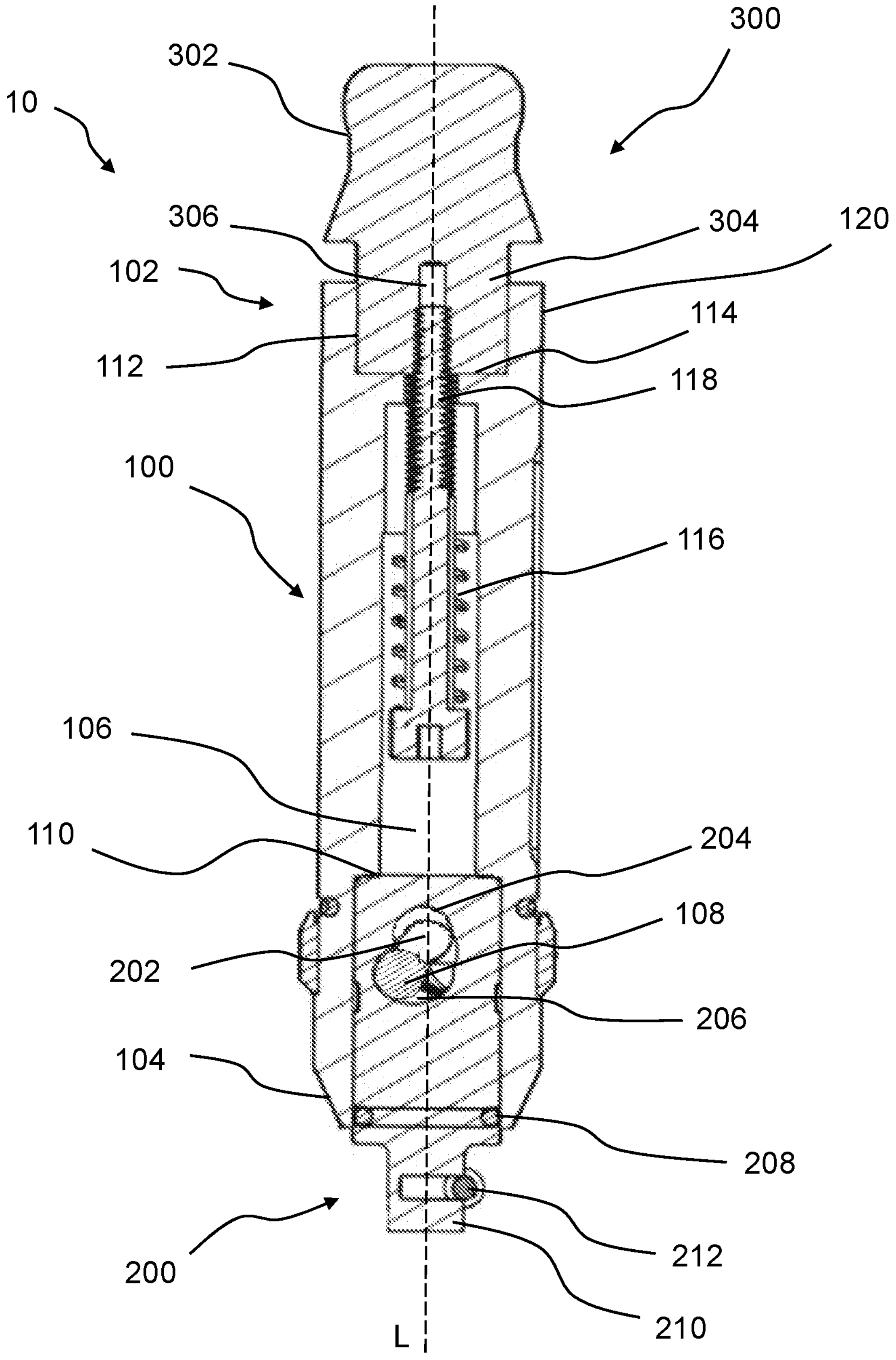
FIG. 1 shows a cross section view of an example of a manual impact driver in a first configuration.

FIG. 1 shows an example of a manual impact driver 10. The manual impact driver comprises a body 100. The body 100 may be substantially cylindrical and elongate, with a first end 102 and a second end 104. The manual impact driver 10 defines a longitudinal axis L along the body 100, from the first end 102 to the second end 104.

The first end 102 of the body 100 may comprise a recess 112. The recess 112 may comprise a base 114 and one or more surrounding walls 120.

The body 100 comprises a through-hole 106 that extends along the longitudinal axis L, from the first end 102 to the second end 104. The through-hole 106 may be a substantially cylindrical through-hole over the majority of the body 100. In one example, the through-hole 106 comprises a step change in diameter to form an internal shoulder 110 within the body 100. The internal shoulder 110 may be situated towards the second end 104.

The body 100 may further comprise a spring-loaded connector 116 and a central column 118 located in the through-hole 106 of the body 100. The spring-loaded connector 116 may be attached to the through-hole 106 between the internal shoulder 110 and the first end 102. The central column 118 may be integrally formed with the spring-loaded connector 116. The central column 118 may extend from the spring-loaded connector 116, along the longitudinal axis L, towards the first end 102 of the body 100. The central column 118 may have an external thread, suitable for attaching components at the first end 102 of the body 100. The central column 118 may be a cap-screw bolt which is attached to the through-hole 106. The sprung-loaded connector 116 may be a coil spring that passes over the central column 118.

The body 100 may further comprise a pin 108, situated between the internal shoulder 110 and the second end 104 of the body 100. The pin 108 may extend across the width of the through-hole 106 of the body 100, perpendicular to the longitudinal axis L. The pin 108 may be substantially cylindrical. The pin 108 may be fixed relative to the body 100. In one example, the pin 108 is integrally moulded to the body 100.

The body 100 may be made of steel. The steel may be an impact resistant alloy steel. The body 100 may be tapered towards the second end 104.

The first end 102 of the body 100 is suitable to receive a linear impact force. The linear impact force may be generated by a user striking the first end 102 of the body 100, with a striking implement such as a hammer. In other examples, the first end 102 may include a self-striking hammer such that an additional striking implement is not required.

The manual impact driver 10 may further comprise a replaceable anvil 300, coupled to the body 100 at the first end 102. The replaceable anvil 300 comprises an anvil head 302 and an anvil slider 304.

The anvil slider 304 may be housed substantially within the recess 112 of the first end 102 of the body 100. The anvil slider 304 may abut against the base 114 of the recess 112 of the first end 102, in use.

The anvil head 302 extends beyond the first end 102 of the body 100. A linear force could be applied to the anvil head 302. For example, the anvil head 302 is configured to be struck, by a user with a striking implement such as a hammer. The linear force will be transferred from the anvil head 302 to the body 100, through the contact between the anvil slider 304 and the base 114 of the recess 112.

The anvil slider 302 may comprise an internally threaded bore 306. The internally threaded bore 306 may be sized to receive the central column 118 of the body 100. Alternatively, the central column 118 may be integrally formed with the anvil slider 304, which may connect to the spring-loaded connector 116 The spring-loaded connector 308 biases the replaceable anvil 300 to a first position, such that the anvil slider 304 is housed substantially within the recess 112 of the body 100.

In other examples, the replaceable anvil 300 may comprise a slide hammer. In this example, the slide hammer may connect to the body 100 by attaching to the spring-loaded connector 308. The slide hammer comprises an integrated weight, which can slide along its length, to deliver a linear force to the body 100. The slide hammer would aid the user in situations when swinging a hammer is not practicable; for example, when there are access limitations.

The replaceable anvil 300 of the manual impact driver 10 allows for replacement of a part which is relatively cheap, compared to replacing the entire impact driver 10.

The manual impact driver 10 further comprises a sliding member 200, coupled to the body 100. In one example, the sliding member 200 is coupled to the body 100 at the second end 104. The sliding member 200 comprises a helical cavity 202. The helical cavity 202 extends across the width of the sliding member 200 and rotates along the longitudinal axis L of the impact driver 10. The helical cavity 202 comprises a helical axis, or screw axis. The helical axis is parallel to the longitudinal axis L of the manual impact driver 10. The helical cavity 202 comprises a first end 204, situated towards the first end 102 of the body 100 along the longitudinal axis L, and a second end 206, situated towards the second end 104 of the body 100 along the longitudinal axis L.

The helical cavity 202 may be a cavity 202 that extends through the sliding member 200, perpendicular to the longitudinal axis L, such that an entrance of the cavity 202 is formed on opposite sides of the sliding member 200. The cavity 202 may have a constant cross-section, wherein the cross-section rotates as the cavity 202 progresses across the sliding member 200. In other words, the cavity 202 twists along a length of the sliding member. The sliding member 200 is housed substantially within the through-hole 106 at the second end 104 of the body 100. The pin 108 of the body 100 extends through the helical cavity 202 of the sliding member 200.

The sliding member 200 further comprises a visual indicator 208. The visual indicator 208 may be a coloured band extending around the sliding member 200.

The sliding member 200 further comprises an attachment portion 210. The attachment portion 210 is suitable for allowing the attachment of a component, such as a tool 500 or a screwdriver. In one example, the attachment portion 210 may be a standard square adaptor, such that the attachment portion 210 may be universally attached to different tools and accessories. For example, the attachment portion 210 could be a % inch (12.7 mm), % inch (6.35 mm) or ⅜ inch (9.525 mm) standard square connector. In other examples, the attachment portion 210 may be a standard hexagonal connector. The attachment portion 210 may have a spring-loaded ball 212. The spring-loaded ball 212 may be a spring-loaded detent ball, such that the connection to attached tools is secure, and does not come loose, in use.

The sliding member 200 and the body 100 are configured to move with respect to each other, by virtue of the pin 108 and the helical cavity 202 moving with respect to each other. The pin 108 extends through the helical cavity 202. Due to the geometry of the helical cavity 202 and the pin 108, as the sliding member 200 is moved linearly relative to the body 100 along the longitudinal axis L, the sliding member 200 will also rotate due to the interaction of the helical cavity 202 and the pin 108. That is, the sliding member 200 may rotate, with respect to the body 100 (or vice versa), such that, before rotation, the pin 108 is at or towards one of the first or second ends 204, 206 of the helical cavity 202, and, after rotation, is at or towards the other first or second end (204, 206) of the helical cavity 202.

Figure 2:
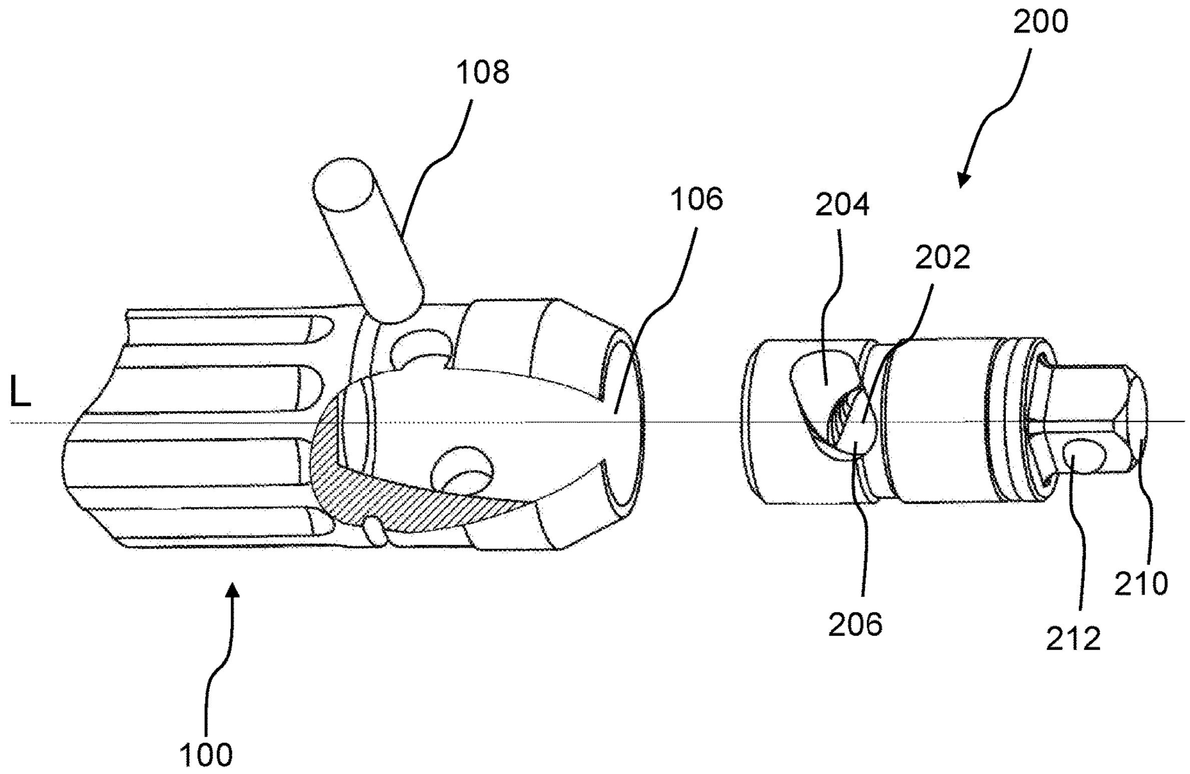
FIG. 2 shows a concentrated, exploded view of an example of part of the manual impact driver.

FIG. 2 shows a concentrated, exploded view of the interaction between the sliding member 200 and the body 100. In FIG. 2, the sliding member 200 has been removed from the body 100 for clarity. The pin 108 has also been removed from the body 100 and sliding member 200 for clarity. FIG. 2 shows how the pin 108 may extend through the helical cavity 202 of the sliding member 200.

Figure 3:
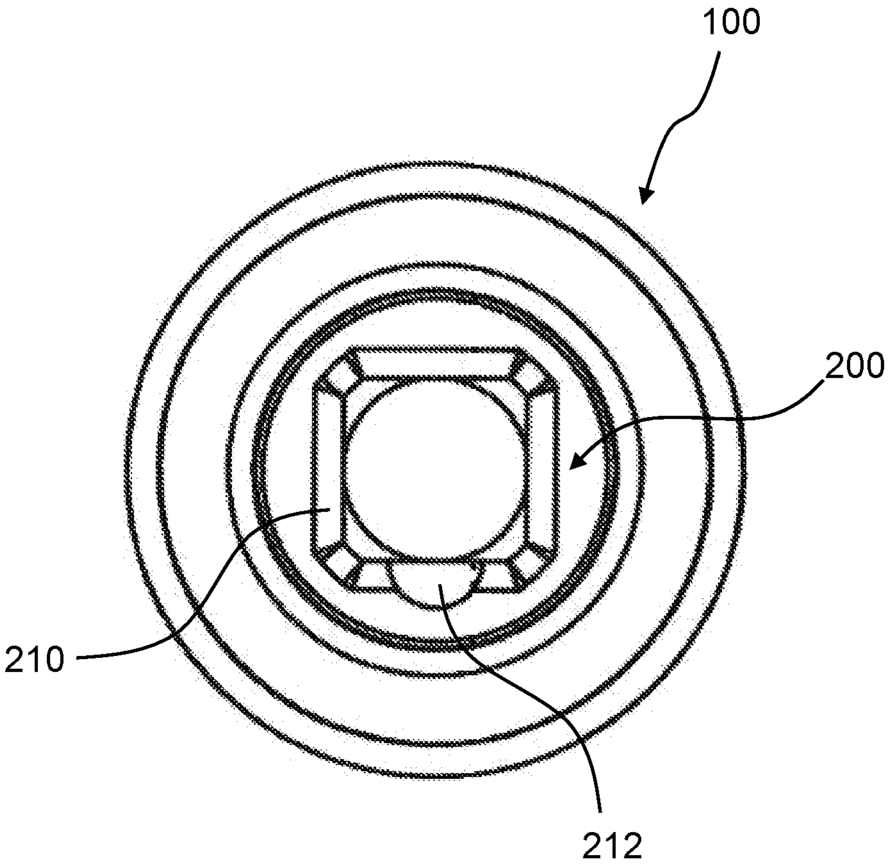
FIG. 3 shows an end view of an example of the manual impact driver.

FIG. 3 shows an end view of an example of the manual impact driver 10. The end view shows the body 100 and the sliding member 200. The attachment portion 210 and the spring-loaded ball 212 of the sliding member 200 are also shown.

The interaction between the body 100 and the sliding member 200 will now be described in more detail. The impact driver 10 is movable between a first configuration and a second configuration. In the first configuration (shown in FIG. 1) the pin 108 of the body 100 is located towards the second end 206 of the helical cavity 202, and the sliding member 200 is abutted against the internal shoulder 110 of the body 100. The abuttal of the sliding member 200 against the internal shoulder 110 means that upon a linear force being applied to the first end 102 of the body 100, the force is transferred from the body 100 to the sliding member 110 through the contact at the internal shoulder 110, thereby substantially bypassing the pin 108.

Figure 4:
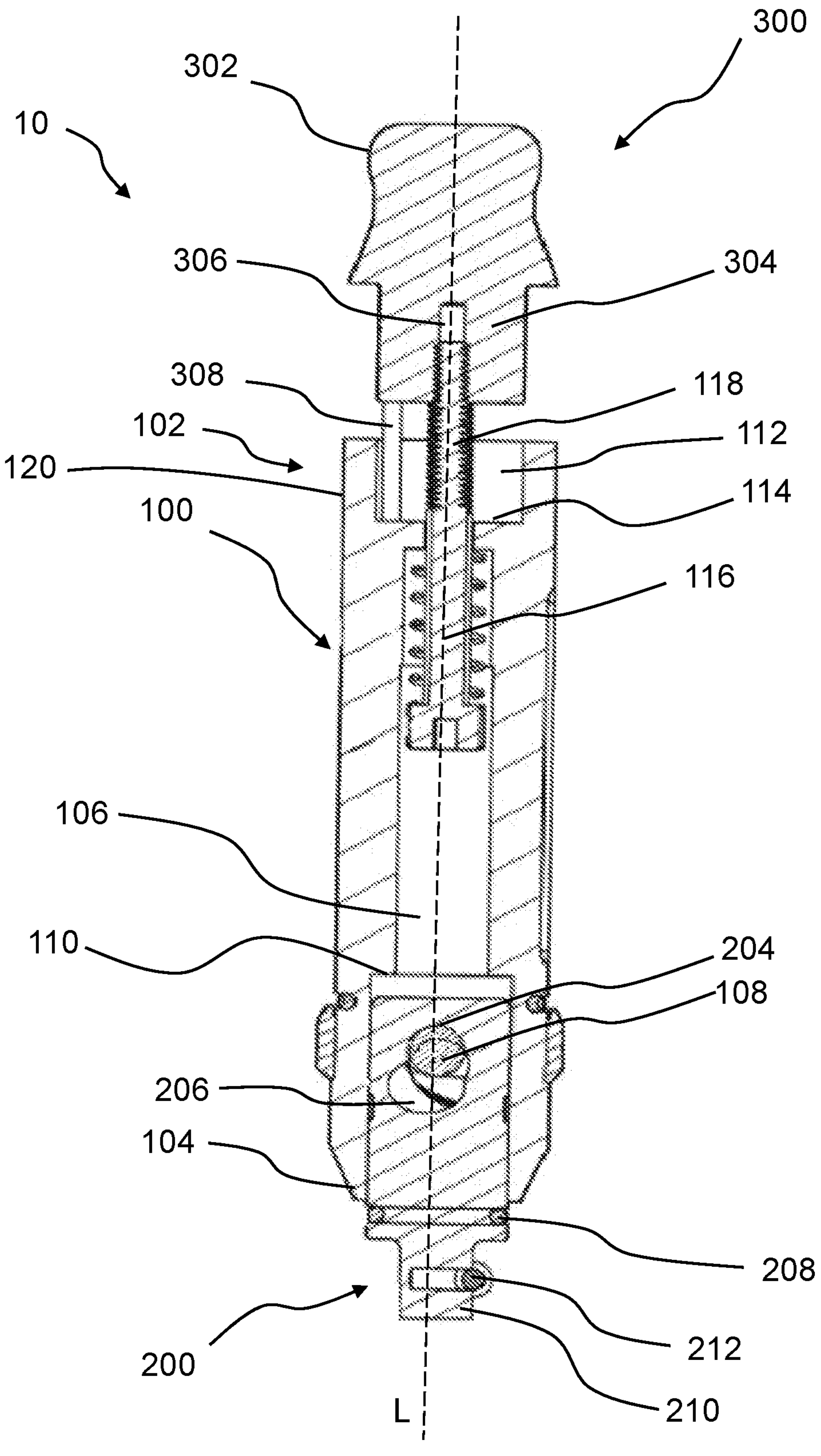
FIG. 4 shows a cross section view of an example of the manual impact driver in a second configuration.

FIG. 4 shows the second configuration of the impact driver 10. In the second configuration, the pin 108 is located at the first end 204 of the helical cavity 202 and the sliding member 200 is spaced from the internal shoulder 110. In the second configuration, the visual indicator 208 of the sliding member 200 may be visible to the user.

The manual impact driver 10 is movable between the first and second configuration upon rotation of the body 100 with respect to the sliding member 200.

When the manual impact driver 10 is in the first configuration, upon receiving a linear impact force at the first end 102, the linear impact force is translated along the longitudinal axis L from the first end 102 of the body 100 to the sliding member 200. In the first configuration, in the absence of any reactive forces, the linear impact force causes the body 100 and the sliding member 200 to move together along the longitudinal axis L of the manual impact driver 10.

When the manual impact driver 10 is in the second configuration, upon receiving a linear impact force at the first end 102 the linear impact force produces a torque, about the longitudinal axis L, at the sliding member 200, because of the interaction between the helical cavity 206 and the pin 108. After receiving the linear impact force in the second configuration, the manual impact driver 10 is configured to return to the first configuration. In the second configuration, the linear impact force causes the sliding member 200 to move relative to the body 100, along the longitudinal axis L of the manual impact driver 10, such that the sliding member 200 rotates relative to the body 100 as the helical cavity 202 moves relative to the pin 108.

FIG. 4 further shows the replaceable anvil 300. The replaceable anvil 300 may further comprise a spigot 308. The spigot 308 is located on the anvil slider 304. When the replaceable anvil 300 is in the position in which the anvil slider 304 is housed substantially within the through-hole 106 of the body 100, the spigot 308 is housed within a locator hole (not shown in the figures) in the body 100. The locator hole is a bore at the first end 102 of the body 100.

The replaceable anvil 300 may be movable between a first position (as shown in FIG. 1) in which the anvil slider 304 is housed substantially within the through-hole 106 of the body 100 and the spigot 308 is housed within a locator hole, and a second position (as shown in FIG. 4), in which in which the anvil slider 304 is retracted from the through-hole 106 of the body and the spigot 308 is retracted from locator hole. The second position of the replaceable anvil 300 is achieved through the extension of the spring-loaded connector 308.

In the second position, the replaceable anvil 300 may be rotated with respect to the longitudinal axis L, such that the spigot 308 is mis-aligned with the locator hole and is seated on the first end 102 of the body 100. In this mis-aligned position, the spigot 308 prevents the spring-loaded connector 308 from returning the replaceable anvil 300 to the first position.

Figure 5:
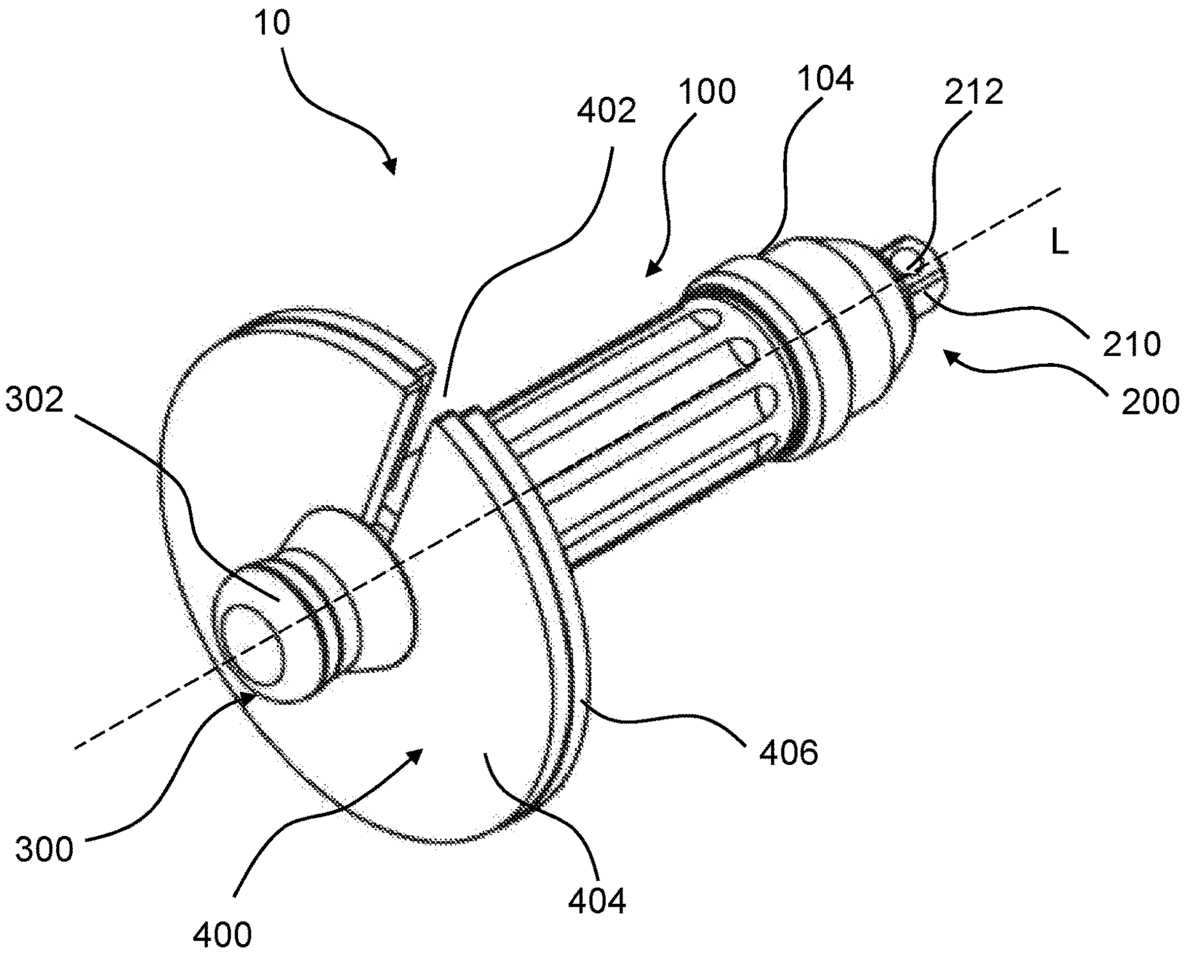
FIG. 5 shows a perspective view of an example of the manual impact driver include a protection plate.

FIG. 5 shows a perspective view of an example of the manual impact driver 10. The manual impact driver 10 may further comprise a removable protection plate 400. The protection plate 400 may be located between a part of the replaceable anvil 300 and the body 100. The protection plate 400 may be a substantially flat, circular plate.

The protection plate 400 may comprise a cut-out section 402 to allow for the attachment and removal to and from the impact driver 10, when the replaceable anvil 300 is in the second position. Upon attachment of the protection plate 400 between a part of the replaceable anvil 300 and the body 100, when the replaceable anvil is in the second position, the replaceable anvil 300 may be rotated such that the spigot 308 locates, and is received in the locator hole, thereby moving the replaceable anvil 300 to the first position.

When the replaceable anvil 300 is in the first position, with the protection plate 400 attached, the protection plate 400 may rotate freely, with respect to the body 100.

The protection place 400 may further comprises a first layer 404 and a second layer 406. The first layer 404 may be a substantially rigid layer. For example, the first layer 404 may be a metal layer, such as steel. The first layer 404 is suitable for receiving and absorbing strikes from a hammer which are the result of a foul blow on the replaceable anvil 300. The second layer 406 may be a flexible layer to cushion any mis-strikes. For example, the second layer 406 comprise a dense foam thereby providing a more comfortable surface for a user's hand to rest against.

Figure 6:
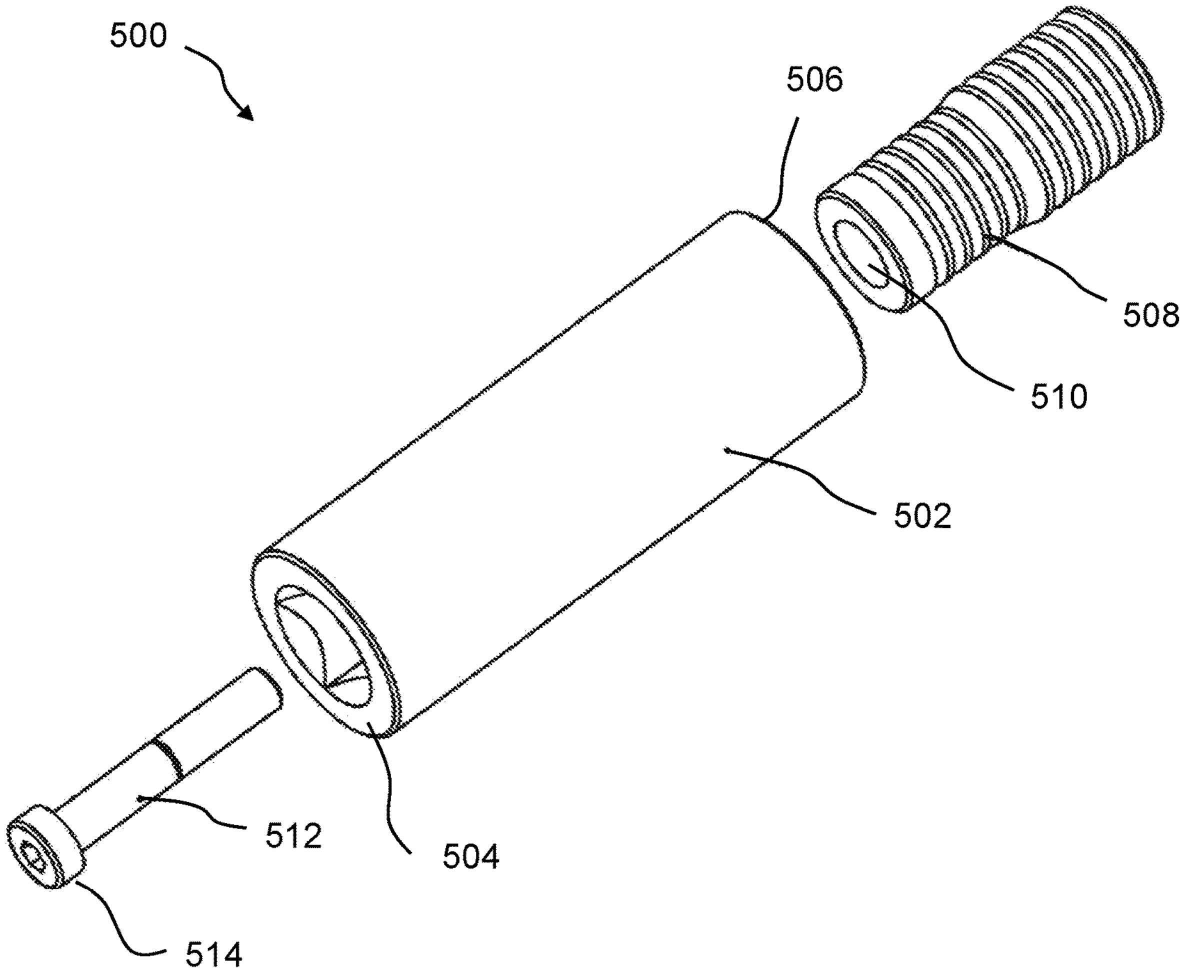
FIG. 6 shows an exploded view of an example of a tool.

FIG. 6 shows an exploded view of an example of a tool 500 for use with the manual impact driver 10. In this example, the tool 500 comprises an elongate tool body 502 having a first tool end 504 and a second tool end 506.

The tool 500 may be used to couple the manual impact driver 10, to a further device, such as a locking nut key, or a blade, in use. The tool 500 may have a square socket at a first tool end 504 and a second socket at the second tool end 506.

The tool body 502 may be substantially hollow and suitable for receiving a mandrel 508. The mandrel 508 is be fixed within the tool body 502 and comprises a threaded through-hole 510 for receiving a threaded fixture 512. In one example, the mandrel 502 is tapered from one end to the other and pressed into the hollow body such that there is a friction fit between the mandrel 508 and tool body 502.

The threaded fixture 512 may comprise a head end 514 suitable for coupling with an Allen key or screwdriver or other connection implement.

In use, the threaded fixture 512 is inserted into the tool body 502 and coupled with the threaded through hole 510 of the mandrel and may engage locking nut key, or a blade.

In use, a user may attach a further component, such as the tool 500 to the attachment portion 210 of the sliding member 200. The user may then align the tool 500 and the manual impact driver 10 with a threaded fastening member, such as a wheel lock nut, for removal. Once aligned, the user ensures that the manual impact driver 10 is in the first configuration. The user would know if the manual impact driver 10 was in the first configuration, by the absence of the visual indicator 208. If the manual impact driver 10 is in the second configuration, the user may rotate the body 100 with respect to the sliding member 200 (and therefore, the attached tool 500) to switch to the first configuration.

The user may strike the first end 102 (or, if present, the replaceable anvil 300) with a striking implement, such as a hammer. The linear impact force produced by the user is translated along the longitudinal axis L from the first end 102 to the sliding member 200 and into the tool 500. This linear force causes the tool 500, or any further attached components, to engage the threaded fastening member. For example, the further components may cut into the threaded fastening member or alternatively deform to fit the shape of the patterned groove of the threaded fastening member—these examples may be relevant if the threaded fastening member comprises a locking wheel nut and the corresponding key is not available to couple with the locking wheel nut.

Once the tool 500 is engaged with the threaded fastening member, the user may switch the manual impact driver 10 to the second configuration, by rotating the body 100 with respect to the sliding member 200 (and therefore, the attached tool 500). Upon rotation, the visual indicator 208 would be visible to the user, indicating that the manual impact driver 10 has switched to the second configuration.

The user may then strike the first end 102 (or, if present, the replaceable anvil 300) with the striking implement. The linear impact force produced by the user is produces a torque, about the longitudinal axis L, at the sliding member 200 (and therefore in the tool 500). This torque causes the threaded fastening member to be rotated, thereby loosening the threaded fastening member from its surround, and allowing for its removal.

The torque required to remove a locking wheel nut 100 is typically 230-290 Nm. Traditional methods of removing locking wheel nuts 100 may generate around 110 Nm. In particular, the removable protection plate 400 provides the user with more confidence to strike the impact driver 100, thereby allowing more torque to be generated, allowing for the successful removal of a threaded fastening member.

Figure 7:
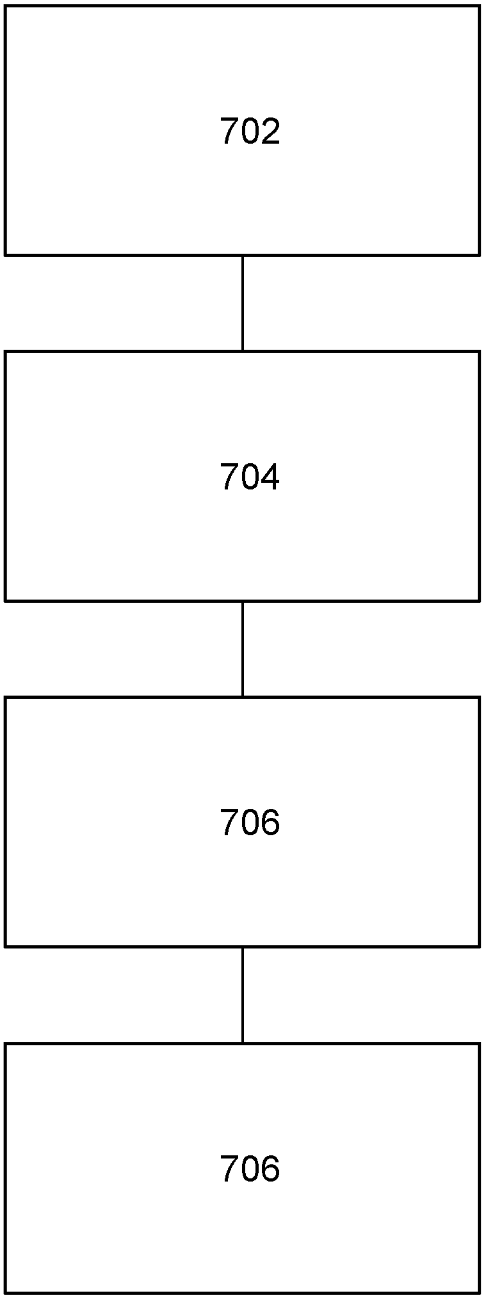
FIG. 7 shows an example of a flow chart of a method of using a manual impact driver.

FIG. 7 shows an example of a flow chart of a method of using a manual impact driver.

In step 702, the manual impact driver 10 is aligned with a threaded fastening member for removal.

In step 704, a linear impact force is applied to a first end 102 of the manual impact driver 10, when the manual impact driver 10 is in the first configuration. The linear impact force is translated along the longitudinal axis L of the manual impact driver 10 to the sliding member 200.

In step 706 a user switches the manual impact driver 10 from the first configuration to the second configuration by rotating the body 100 with respect to the sliding member 200.

In step 708, a linear impact force is applied to the first end 102 of the body 100, such that, upon impact, the linear impact force produces a torque, about the longitudinal axis, at the sliding member.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A manual impact driver for aiding the removal of a threaded fastening member from a structure, the manual impact driver defining a longitudinal axis, the manual impact driver comprising:

a body comprising a first end and a second end; and a sliding member configured to be coupled to the body at the second end, wherein the impact driver is movable between:

a first configuration wherein, upon impact at the first end of the body, a linear impact force is translated along the longitudinal axis from the first end of the body to the sliding member;

a second configuration wherein, upon impact at the first end, the linear impact force produces a torque, about the longitudinal axis, at the sliding member; and wherein the impact driver is operable to switch between the configurations upon rotation, by a user, of the body with respect to the sliding member, wherein the body comprises a through-hole extending from the first end to the second end of the body, the through-hole being shaped to define an internal shoulder located substantially towards the second end, wherein the sliding member is situated inside the through-hole at the second end of the body and defines a helical cavity, wherein the axis of the helical cavity is parallel to the longitudinal axis of the impact driver, wherein the body comprises a pin extending across the through-hole of the body, perpendicular to the longitudinal axis of the manual impact driver, the pin extending through the helical cavity of the sliding member and being fixed relative to the body, wherein when the manual impact driver is in the first configuration, the sliding member is abutted against the internal shoulder, and the pin of the body is located substantially at a second end of the helical cavity situated towards the first end of the body, such that upon impact at the first end, the body and the sliding member move together along the longitudinal axis of the manual impact driver, and wherein when the impact driver is in the second configuration, the sliding member is spaced from the internal shoulder, and the pin of the body is located substantially at a first end of the helical cavity situated towards the second end of the body.

2. The manual impact driver according to claim 1, wherein after impact in the second configuration, the impact driver is configured to return to the first configuration.

3. The manual impact driver according to claim 1, wherein the body further comprises a spring-loaded connector, attached to the through-hole of the body, and a central column, connected to the spring-loaded connector, towards the first end of the body.

4. The manual impact driver according to claim 1, wherein, when the impact driver is in the second configuration, upon impact at the first end, the sliding member is configured to move relative to the body, along the longitudinal axis of the manual impact driver, such that the sliding member rotates relative to the body as the helical cavity moves relative to the pin.

5. The manual impact driver according to claim 1, further comprising a visual indicator configured to be hidden when the impact driver is in the first configuration and viewable when the impact driver is in the second configuration.

6. The manual impact driver according to claim 1, comprising a replaceable anvil at the first end of the body, wherein, in use the anvil is configured to be struck, to produce the linear impact force.

7. The manual impact driver according to claim 6, wherein the replaceable anvil comprises a spigot configured to be received in a locator hole of the body.

8. The manual impact driver according to claim 7, wherein the replaceable anvil is connected to a central column of the body, to allow the replaceable anvil to be retracted from the body, and rotated, to mis-align the spigot from the locator hole, such that the replaceable anvil can be held in a retracted position.

9. The manual impact driver according to claim 6, further comprising a protection plate located between a part of the removable anvil and the body.

10. The manual impact driver according to claim 9, wherein the protection plate is configured to rotate freely, with respect to the body.

11. The manual impact driver according to claim 9, wherein the protection plate is substantially flat, circular plate and comprises a cut-out section to allow for the attachment and removal from the manual impact driver.

12. The manual impact driver according to claim 1, wherein the sliding member further comprises an attachment portion suitable for allowing the attachment of a tool.

13. A method of removal of a threaded fastening member comprising the steps of:

aligning the manual impact driver of claim 1 with the threaded fastening member for removal;

when the manual impact driver is in a first configuration, applying a linear impact force to a first end, wherein the linear impact force is translated along a longitudinal axis of the manual impact driver to a sliding member of the manual impact driver, switching, by a user, from the first configuration to a second configuration, by rotating a body of the manual impact driver with respect to the sliding member; and applying a linear impact force to the first end, wherein upon impact, the linear impact force produces a torque, about the longitudinal axis, at the sliding member.

14. A system of removing a threaded fastening member, comprising;

the manual impact driver according to claim 1, and a tool.

* * * * *